(12) United States Patent
Yokozutsumi et al.

(10) Patent No.: US 7,288,909 B2
(45) Date of Patent: Oct. 30, 2007

(54) ELECTRICAL VEHICLE CONTROLLER

(75) Inventors: Ryo Yokozutsumi, Tokyo (JP); Hideto Negoro, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 65 days.

(21) Appl. No.: 10/570,997

(22) PCT Filed: May 17, 2005

(86) PCT No.: PCT/JP2005/008974

§ 371 (c)(1),
(2), (4) Date: Mar. 8, 2006

(87) PCT Pub. No.: WO2005/110802

PCT Pub. Date: Nov. 24, 2005

(65) Prior Publication Data

US 2007/0063662 A1    Mar. 22, 2007

(30) Foreign Application Priority Data

May 19, 2004 (JP) .............................. 2004-149439

(51) Int. Cl.
*H02P 7/00* (2006.01)
(52) U.S. Cl. ...................... 318/432; 318/434; 318/139; 318/34; 318/66
(58) Field of Classification Search ............... None
See application file for complete search history.

(56) References Cited

U.S. PATENT DOCUMENTS

| | | | | |
|---|---|---|---|---|
| 5,030,898 A | * | 7/1991 | Hokanson et al. | 318/146 |
| 5,480,220 A | * | 1/1996 | Kumar | 303/151 |
| 5,568,023 A | * | 10/1996 | Grayer et al. | 318/139 |
| 6,988,570 B2 | * | 1/2006 | Takeuchi | 180/6.48 |
| 7,122,979 B2 | * | 10/2006 | Wilton et al. | 318/138 |

FOREIGN PATENT DOCUMENTS

| | | |
|---|---|---|
| JP | 63-245203 | 10/1988 |
| JP | 04-121004 | 4/1992 |
| JP | 2000-166008 | 6/2000 |
| JP | 2001-145207 | 5/2001 |

* cited by examiner

*Primary Examiner*—Lincoln Donovan
*Assistant Examiner*—Renata McCloud
(74) *Attorney, Agent, or Firm*—Buchanan Ingersoll & Rooney PC

(57) ABSTRACT

The maximum frequency and the minimum frequency are extracted from frequencies corresponding to respective axle speeds. The minimum frequency is subtracted from the maximum frequency to achieve a first frequency deviation, and also the first frequency deviation is input as a primary delay system to achieve a second frequency deviation. Furthermore, the second frequency deviation is subtracted from the first frequency deviation to achieve an idle running detection setting deviation, and also an idle running detection set value for judging the idle running of the wheels at the frequency level is achieved. The idle running frequency deviation and the idle running detection set value are compared with each other to output an idle running detection signal, and also a torque correction amount of an AC electric motor is calculated on the basis of the idle running detection signal.

7 Claims, 14 Drawing Sheets

ELECTRICAL VEHICLE CONTROLLER

FIELD OF THE INVENTION

The present invention relates to an electrical vehicle controller for controlling idle running of an electrical vehicle driven by an AC electric motor.

BACKGROUND ART

An electrical vehicle is normally accelerated and decelerated by the adhesive force between each wheel and a rail. However, when a driving force larger than the adhesive force is applied at the starting time of the AC electric motor, idle running of wheels occurs. On the other hand, when a braking force larger than the adhesive force is applied at the braking time, slip of the wheels occurs. Therefore, the acceleration/deceleration performance of electrical vehicles has been hitherto enhanced by detecting idle running/slip and reducing occurring torque of the AC electric motor to rapidly induce re-adhesion. For example, according to Patent Document 1, the average speed of the rotational velocities of plural AC electric motors is first calculated, a wheel diameter difference correcting amount of wheels joined to each AC electric motor is calculated on the basis of the ratio between the average speed and the rotational speed of each AC electric motor, and then a reference speed serving as a reference for the re-adhesion control in each control unit is calculated on the basis of the wheel diameter difference correcting amount and the average speed. The idle running of the wheels is detected on the basis of the average speed and the rotational speed of the AC electric motor to be controlled every control unit, and the torque of the AC electric motor is narrowed down in accordance with the difference between the reference speed and the rotational speed of the AC electric motor to be controlled every control unit, thereby performing the idle running re-adhesion control.

Patent Document 1: JP-A-2001-145207 (Page 3, FIG. 1)

DISCLOSURE OF THE INVENTION

Problem to be Solved by the Invention

However, in the conventional electrical vehicle controller, the idle running is detected on the basis of the average speed of the AC electric motor and the rotational speed of the AC electric motor to be controlled as described above, and thus the torque control is carried out in accordance with the difference between the reference speed and the rotational speed of the AC electric motor to be controlled every control unit. Therefore, average speed calculating means and the wheel diameter difference correcting amount calculating means are necessary, and thus there is a problem that the control is complicated.

The present has been implemented to solve the foregoing problem, and has an object to provide an electrical vehicle controller that can simplify the control and perform rapid processing.

Means for Solving the Problem

According to the invention, an electrical vehicle controller for detecting the axle speeds of axles corresponding to plural AC electric motors torque-controlled by an inverter and detecting idle running of the axle directly connected to the axles comprises: high-level priority calculating means for extracting the maximum frequency from the frequencies corresponding to the respective axle speeds; low-level priority calculating means for extracting the minimum frequency from the frequencies corresponding to the respective axle speeds; a first subtracter for subtracting the minimum frequency from the maximum frequency to calculate a first frequency deviation; primary delay means for receiving the first frequency deviation as a primary delay system to calculate a second frequency deviation; a second subtracter for subtracting the second frequency deviation from the first frequency deviation to calculate an idle running frequency deviation; idle running detection setting means for outputting an idle running detection set value for judging the idle running of the wheels at the frequency level; idle detecting means for comparing the idle running frequency deviation with the idle running detection set value and outputting an idle running detection signal when the idle running frequency deviation is larger than the idle running detecting set value; and torque correcting means for calculating a torque correction amount of the AC electric motor on the basis of the idle running detection signal and instructing torque correction to the inverter.

Advantage of the Invention

According to the invention, the second frequency deviation is subtracted from the first frequency deviation to calculate the idle running frequency deviation that varies only under the idle running state, and the idle running frequency deviation and the idle running detecting set value are compared with each other to output the idle running detection signal. Therefore, the idle running detection can be instantaneously performed without being affected by a wheel diameter difference, and there can be achieved an effect that simple and rapid/accurate torque correction control can be performed.

BEST MODES FOR CARRYING OUT THE INVENTION

FIRST EMBODIMENT

FIG. 1 is a construction diagram showing the relationship of an electrical vehicle controller, an inverter and AC electric motors according to a first embodiment. In FIG. 1, DC power collected from an overhead wire 1 through power collector 2 is supplied to an inverter 3 and converted to three-phase AC power of U-phase, V-phase and W-phase. AC electric motors 4 to 7 for an electrical vehicle such as induction motors or the like are driven by the three-phase AC power as the output of the inverter 3. The rotational numbers N1 to N4 of the respective AC electric motors 4 to 7 which are detected by pulse generators 8 to 11 are input to an electrical vehicle controller 12. Furthermore, input current INU, INV, INW of the AC electric motors 4 to 7 which are detected by current detectors 13 to 15 are input to the electrical vehicle controller 12. Furthermore, a driver's platform instruction signal 16 of a power running notch instruction from a driver's platform (not shown) and a load weighting instruction signal 17 from a load weighting device (not shown) are input to the electrical vehicle controller 12. q-axis current control of the inverter 3 is carried out by a q-axis current control signal 18 output from the electrical vehicle controller 12.

FIG. 2 is a block diagram showing an internal construction of the electrical vehicle controller 12 according to a first embodiment implementing the invention. In FIGS. 1 and 2, in the axle speed calculating means 19, the frequencies FM1 to FM4 corresponding to the respective axle speeds of the axles (not shown) which are directly connected to the wheels (not shown) are calculated from the rotational numbers N1 to N4 of the AC electric motors 4 to 7 detected by the pulse generators 8 to 11. The high-level priority calculating means 20 extracts the maximum frequency FMMAX corresponding to the axle speed of the axle directly connected to the minimum-diameter wheel. Furthermore, the low-level priority calculating means 21 likewise extracts the minimum frequency FMMIN from the respective frequencies FM1 to FM4. Subsequently, the minimum frequency FMMIN is subtracted from the maximum frequency FMMAX in a first subtracter 22 to calculate a first frequency deviation $\Delta FM1$.

The first frequency deviation $\Delta FM1$ is input to primary delay means 23 as a primary delay system to calculate a second frequency deviation $\Delta FM2$. Subsequently, in a second subtracter 24, the second frequency deviation $\Delta FM2$ is subtracted from the first frequency deviation $\Delta FM1$ to calculate an idle running frequency deviation $\Delta FMS$.

Furthermore, an idle running detecting set value $\Delta FMA1$ for judging the idle running at the frequency level is output from idle running detection setting means 25. In idle running detecting means 26, the idle running frequency deviation $\Delta FMS$ and the idle running detection setting value $\Delta FMA1$ are compared with each other, and when the idle running frequency deviation $\Delta FMS$ is larger than the idle running detection setting value $\Delta FMA1$, the idle running detecting means 26 outputs an idle running detection signal 26a having the analog amount corresponding to the difference between the idle running frequency deviation and the idle running detection setting value. In a torque instruction correcting means 27 to which the idle running detection signal 26a is input, a torque correction amount $\Delta T$ of a torque pattern is calculated in accordance with the idle running detection signal 26a.

Furthermore, a driver's platform instruction signal 16 corresponding to power running notch instructed from a driver's platform at the power running time of the electrical vehicle and a load weighting instruction signal 17 corresponding to the weight of the electrical vehicle are input to a torque instruction calculating means 28. In the torque instruction calculating means 28, a torque instruction signal TP corresponding to the torque to be output the AC electric motors 4 to 7 is output from both the instruction signals 16, 17. The torque instruction correcting means 29 outputs only when idle running occurs, and it subtracts the torque correction amount $\Delta T$ from the torque instruction signal TP to narrow down the torque instruction correcting signal TP1. Subsequently, vector control calculating means 30 calculates the q-axis current corresponding to the torque of the AC electric motors 4 to 7 on the basis of the input current INU, INV, INW of the AC electric motors 4 to 7 and the torque instruction correction signal TP1, and outputs a q-axis current control signal 18. The inverter 3 reduces the torque pattern on the basis of the q-axis current control signal 18 to carry out idle running re-adhesion control.

In the electrical vehicle controller 12 thus constructed, the second frequency deviation $\Delta FM2$ which varies in accordance with a wheel diameter difference is calculated in the primary delay means 23 to which the first frequency deviation $\Delta FM1$ is input, and the second frequency deviation $\Delta FM2$ is subtracted from the first frequency deviation $\Delta FM1$ in the second subtracter 24 to calculate the idle frequency deviation $\Delta FMS$ varying only at the idle running time. In the idle running detecting means 26, the idle detection is carried out through the comparison between the idle running frequency deviation $\Delta FMS$ and $\Delta FMA1$. Therefore, as is apparent from the frequency-time characteristic of each signal shown in FIG. 3, the idle running detection set value $\Delta FMA1$ can be set without being affected by the wheel diameter difference, so that the time point when the idle running frequency deviation $\Delta FMS$ exceeds the idle running detection set value $\Delta FMA1$ is detected as occurrence of idle running, and the idle running re-adhesion control is carried out in accordance with the deviation concerned. Accordingly, it is unnecessary to carry out the calculation of the average speed of the AC electric motors 4 to 7 and the calculation of the wheel diameter difference correction amount, so that the construction can be simplified and the rapid processing can be performed.

SECOND EMBODIMENT

FIG. 4 is a block diagram showing an electrical vehicle controller 12 according to a second embodiment of the invention. In FIG. 4, 16 to 22, 28 to 30 represent the same elements as the first embodiment.

In FIGS. 1 and 4, the first frequency deviation $\Delta FM1$ is calculated in the first subtracter 22 as in the case of the first embodiment. When the first frequency deviation $\Delta FM1$ is input to first time-differentiating means 31, a first time variation amount $\Delta FM1D$ is calculated by time-differentiating the first frequency deviation $\Delta FM1$ from a predetermined time measurement start time for a predetermined time t1. Furthermore, the first frequency deviation $\Delta FM1$ is input to second time-differentiating means 32, and time-differentiated from a predetermined time measurement start time for a predetermined time t2 longer than the time t1 to calculate a temporary time variation amount $\Delta FM2D(t2)$.

Subsequently, in converting means 33, the temporary time variation amount $\Delta FM2D(t2)$ is converted to a variation amount of the time t1, the second time variation amount $\Delta FM2D$ is output. Subsequently, the first time variation amount $\Delta FM1D$ is subtracted from the second time variation amount $\Delta FM2D$ in the second subtracter 34 to calculate an idle running frequency deviation $\Delta FMS$. Furthermore, an idle running detection set value $\Delta FMAD$ for judging the idle running at the frequency level is output from the idle running detection setting means 35. When the idle running frequency deviation $\Delta FMS$ is larger than the idle running detection set value $\Delta FMAD$ in the idle running detecting means 36, an idle running detection signal 36a having the analog amount corresponding to the difference between them is output.

In torque instruction correcting means 37 to which the idle running detection signal 36a is input, the torque correction amount $\Delta T$ of the torque pattern is calculated in accordance with the idle running detection signal 36a. Subsequently, as in the case of the first embodiment, the q-axis current control signal 18 is supplied to the inverter 3 through the vector control calculating means 30 on the basis of the torque instruction correction signal TP1 achieved by subtracting the torque correction amount $\Delta T$ from the torque instruction signal TP, and the q-axis current of the AC electric motors 4 to 7 is controlled, thereby performing the idle running re-adhesion control.

In the electrical vehicle controller 12 thus constructed, the first time variation amount for the time t1 is subtracted from the second time variation amount for the time t2 to calculate the idle running frequency deviation $\Delta FMS$, and when the idle running frequency deviation $\Delta FMS$ is larger than the idle running detection set value $\Delta FMAD$, the idle running is detected and the idle running detection signal is output. Therefore, as is apparent from the frequency-time characteristic of each signal shown in FIG. 5, the calculation of the average speed of the AC electric motors 4 to 7 and the calculation of the wheel diameter difference correction amount are unnecessary, so that the construction can be simplified and the rapid processing can be performed.

THIRD EMBODIMENT

FIG. 6 is a block diagram showing an electrical vehicle controller 12 according to a third embodiment. In FIGS. 1 and 6, 16 to 24, 28 to 30 represent the same elements as the first embodiment.

In FIGS. 1 and 6, the first frequency deviation $\Delta FM1$ is calculated in the first subtracter 22 as in the case of the first embodiment. Furthermore, the first frequency deviation $\Delta FM1$ is input to the primary delay means 23, and the second frequency deviation $\Delta FM2$ is calculated as the primary delay system. Subsequently, in the second subtracter 24, the second frequency deviation $\Delta FM2$ is subtracted from the first frequency deviation $\Delta FM1$ to calculate the idle running frequency deviation $\Delta FMS$. Then, the idle running detection set value $\Delta FMA2$ for judging the idle running at the frequency level is output from the idle running detection setting means 38. In this embodiment, the idle running detection set value $\Delta FMA2$ is set by a predetermined value, for example so that the acceleration is switched in accordance with the motor characteristic when the frequency corresponding to the axle speed input from the low-level priority calculating means 21 reaches a predetermined value as shown in FIG. 7 (for example, when the frequency shifts from the constant acceleration area of the AC electric motor 4 to 7 and reaches the motor characteristic area).

Subsequently, in the idle running detecting means 39, the idle running frequency deviation $\Delta FMS$ and the idle running detection set value $\Delta FMA2$ are compared with each other, and when the idle running frequency deviation $\Delta FMS$ is larger than the idle running detection set value $\Delta FMA2$, the idle running detection signal 39a having the analog amount corresponding to the difference between them is output. The torque correction amount $\Delta T$ of the torque pattern is calculated in accordance with the idle running detection signal 39a. Subsequently, as in the case of the first embodiment, the torque correction amount $\Delta T$ is subtracted from the torque instruction signal TP, and the q-axis current control of the AC electric motors 4 to 7 is carried out through the vector control calculating means 30 on the basis of the torque correction signal TP1.

As is apparent from the frequency-time characteristic of each signal shown in FIG. 7, the acceleration performance is varied in a high speed area because of the characteristics of the AC electric motors 4 to 7, and thus the idle running detection in the high speed area can be more surely performed by varying the idle running detection set value in accordance with the acceleration performance.

From the first embodiment, the four AC electric motors 4 to 7 are driven in the third embodiment. However, the same effect is expected when four or more AC electric motors are driven.

FOURTH EMBODIMENT

The subsequent embodiments relate to a case where slip control is also carried out in addition to the idle running control.

FIG. 8 is a construction diagram showing the relationship of the electrical vehicle controller, the inverter and the AC electric motors according to a fourth embodiment when the slip control is carried out. In FIG. 8, 1 to 15, 18 represent the same elements as the first embodiment.

In FIG. 8, by a vehicle braking operation, the rotational numbers N1 to N4 of the respective AC electric motors 4 to 7 detected by the pulse generators 8 to 11 and the input current INU, INV, INW of the AC electric motors 4 to 7 detected by the current detectors 13 to 15 are input to the electrical vehicle controller 12 as in the case of the first embodiment. Furthermore, a brake instruction signal 41 from a driver's platform (not shown) and a brake force instruction signal 42 corresponding to the amount of brake from a brake reception device (not shown) are input to the electrical vehicle controller 12. The q-axis current control of the inverter 3 is carried out on the basis of the q-axis current control signal 18 from the electrical vehicle controller 12.

FIG. 9 is a block diagram showing the electrical vehicle controller 12 according to the fourth embodiment of the invention. In FIG. 9, 18 to 24, 28 to 30 represents the same elements as the first embodiment. In FIGS. 8 and 9, the first frequency deviation $\Delta FM1$ is calculated in the first subtracter 22 as in the case of the first embodiment. Furthermore, the first frequency deviation $\Delta FM1$ is input to the primary delay means 23, and the second frequency deviation $\Delta FM2$ is calculated as a primary delay system. Subsequently, in the second subtracter 24, the second frequency deviation $\Delta FM2$ is subtracted from the first frequency deviation $\Delta FM1$ to calculate a slip frequency deviation $\Delta FMS1$. A slip detection set value $\Delta FMA3$ for judging the slip at the frequency level is output from the slip detection setting means 43. In slip detecting means 44, the slip frequency deviation $\Delta FMS1$ and the slip detection set value $\Delta FMA1$ are compared with each other, and when the slip frequency deviation $\Delta FMS1$ is larger than the slip detection set value $\Delta FMA3$, a slip detection signal 44a having the analog amount corresponding to the difference between them is output. In torque instruction correcting means 45 to which the slip detection signal 44a is input, the torque correction amount $\Delta T$ of the torque pattern is calculated in accordance with the slip detection signal 44a.

Furthermore, the brake instruction signal 41 corresponding to power running notch instructed from a driver's platform when the electric vehicle is braked, and the brake force instruction signal 42 corresponding to the brake force of the electrical vehicle from the brake reception device are input to the torque instruction calculating means 28. In the torque calculating means, the torque instruction signal TP corresponding to the torque to be output to the AC electric motors 4 to 7 on the basis of both the instruction signals 41, 42. Subsequently, as in the case of the first embodiment, the q-axis current control of the AC electric motors is carried out through the vector control calculating means 30 on the basis of the torque instruction correction signal TP1 achieved by subtracting the torque correction amount $\Delta T$ occurring under slip from the torque instruction signal TP.

As described above, when the electrical vehicle is slipped under braking operation, the second frequency deviation $\Delta FM2$ varying in accordance with the wheel diameter difference is calculated in the primary delay means 23 to which the first frequency deviation $\Delta FM1$ is input, and in the second subtracter 24, the second frequency deviation $\Delta FM2$ is subtracted from the first frequency deviation $\Delta FM1$ to calculate the slip frequency deviation $\Delta FMS1$ varying only under slip. When the slip frequency deviation $\Delta FMS1$ is larger than the slip detection set value $\Delta FMA3$ in the slip detecting means 44, slip is detected and thus the slip detection signal is output. Therefore, as is apparent from the frequency-time characteristic of each signal shown in FIG. 10, the calculation of the average speed of the AC electric motors 4 to 7 and the calculation of the wheel diameter difference correction amount are not required, so that the construction can be simplified and the rapid processing can be performed.

FIFTH EMBODIMENT

FIG. 11 is a block diagram showing an electrical vehicle controller 12 of a fifth embodiment according to the invention. In FIG. 11, 18 to 22, 28 to 30 represents the same elements as the first embodiment, 31 to 34 represent the same elements as the second embodiment, 41 and 42 represent the same elements as the fourth embodiment.

In FIGS. 1, 4, 9 and 11, the first frequency deviation ΔFM1 is calculated in the first subtracter 22 as in the case of the first embodiment. Furthermore, when the first frequency deviation ΔFM1 is input to the first time-differentiating means 31 as in the case of the second embodiment, the first frequency deviation ΔFM1 is time-differentiated from the predetermined time measurement start time for the predetermined time t1 to calculate the first time variation amount ΔFM1D. Furthermore, the first frequency deviation ΔFM1 is input to the second time-differentiating means 32, and time-differentiated from the predetermined time measurement start time for the time t2 longer than the time t1 to calculate the temporary time variation amount ΔFM2D (t2)

Subsequently, the converting means 33 converts the temporary time variation amount ΔFM2D(t2) to the variation amount of the time t1, and outputs the second time variation amount ΔFM2D. In the second subtracter 34, the first time variation amount ΔFM1D is subtracted from the second time variation amount ΔFM2d to calculate the slip frequency deviation ΔFMS1. Furthermore, the slip detection set value ΔFMAD1 for judging the slip at the frequency level is output from slip detection setting means 46. When the slip frequency deviation ΔFMS1 is larger than the slip detection set value ΔFMAD1 in slip detecting means 47, a slip detection signal 47a having the analog amount corresponding to the difference therebetween is output.

The torque correction amount ΔT of the torque pattern is calculated in accordance with the slip detection signal 47a in torque instruction correcting means 48 to which the slip detection signal 47a is input. Subsequently, as in the case of the first embodiment, the q-axis current control signal 18 is supplied to the inverter 3 through the vector control calculating means 30 on the basis of the torque instruction correction signal TP1 achieved by subtracting the torque correction amount ΔT from the torque instruction signal TP, and the q-axis current of the AC electric motors 4 to 7 is controlled to perform the slip re-adhesive control.

In the electrical vehicle controller 12 thus constructed, the first time variation amount for the time t1 is subtracted from the second time variation amount for the time t2 to calculate the slip frequency deviation ΔFMS1, and when the slip frequency deviation ΔFMS1 is larger than the slip detection set value ΔFMAD1, the slip is detected, and the slip detection signal is output. Therefore, as is apparent from the frequency-time characteristic of each signal shown in FIG. 12, even under the slip state occurring during the braking operation of the vehicle, the calculation of the average speed of the AC electric motors 4 to 7 and the calculation of the wheel diameter difference correction amount are unnecessary, so that the control construction can be simplified and the rapid processing can be performed.

SIXTH EMBODIMENT

FIG. 13 is a block diagram showing an electrical vehicle controller according to a sixth embodiment of the invention. In FIGS. 1, 9 and 13 16 to 24, 28 to 30 represents the same elements as the first embodiment, and 41, 42 represent the same elements as the third embodiment.

In FIGS. 1, 9 and 13, the first frequency deviation ΔFM1 is calculated in the subtracter 22 as in the case of the first embodiment. Furthermore, the first frequency deviation ΔFM1 is input to the primary delay means 23, and the second frequency deviation ΔFM2 is calculated as the primary delay system. Subsequently, in the second operator 24, the second frequency deviation ΔFM2 is subtracted from the first frequency deviation ΔFM1 to calculate the slip frequency deviation ΔFMS1. The slip detection set value ΔFMA 4 for judging the slip at the frequency level is output from the slip detection setting means 49. In this sixth embodiment, the slip detection set value ΔFMA4 is set by only a predetermined value, for example so as to switch the acceleration in accordance with the motor characteristic when the frequency corresponding to the axle speed input from the high-level priority calculating means 20 reaches a predetermined value as shown in FIG. 13 (for example, the frequency shifts from the constant acceleration area of the AC electric motors 4 to 7 and reach the motor characteristic area).

Subsequently, in slip detecting means 50, the slip frequency deviation ΔFMS1 and the slip detection set value ΔFMA4 are compared with each other, and when the slip frequency deviation ΔFMS1 is larger than the slip detection set value ΔFMA4, a slip detection signal 50a having the analog amount corresponding to the difference therebetween is output. The torque correction amount ΔT of the torque pattern is calculated in accordance with the slip detection signal 50a. Subsequently, as in the case of the first embodiment, the torque correction amount ΔT is subtracted from the torque instruction signal TP, and the q-axis current control of the AC electric motors 4 to 7 is carried out through the vector control calculating means 30 on the basis of the torque instruction correcting signal TP1.

As is apparent from the frequency-time characteristic of each signal shown in FIG. 14, the deceleration performance is varied in the high speed area because of the characteristics of the AC electric motors 4 to 7, and thus the detection of slip occurring during braking operation in the high speed area of the vehicle can be more surely performed by changing the slip detection set value ΔFMA4 in accordance with the variation of the deceleration performance.

In the fourth to sixth embodiments, the four AC electric motors 4 to 7 are driven, however, the invention is expected to have the same effect in a case where four or more AC electric motors are driven.

Figure 1:
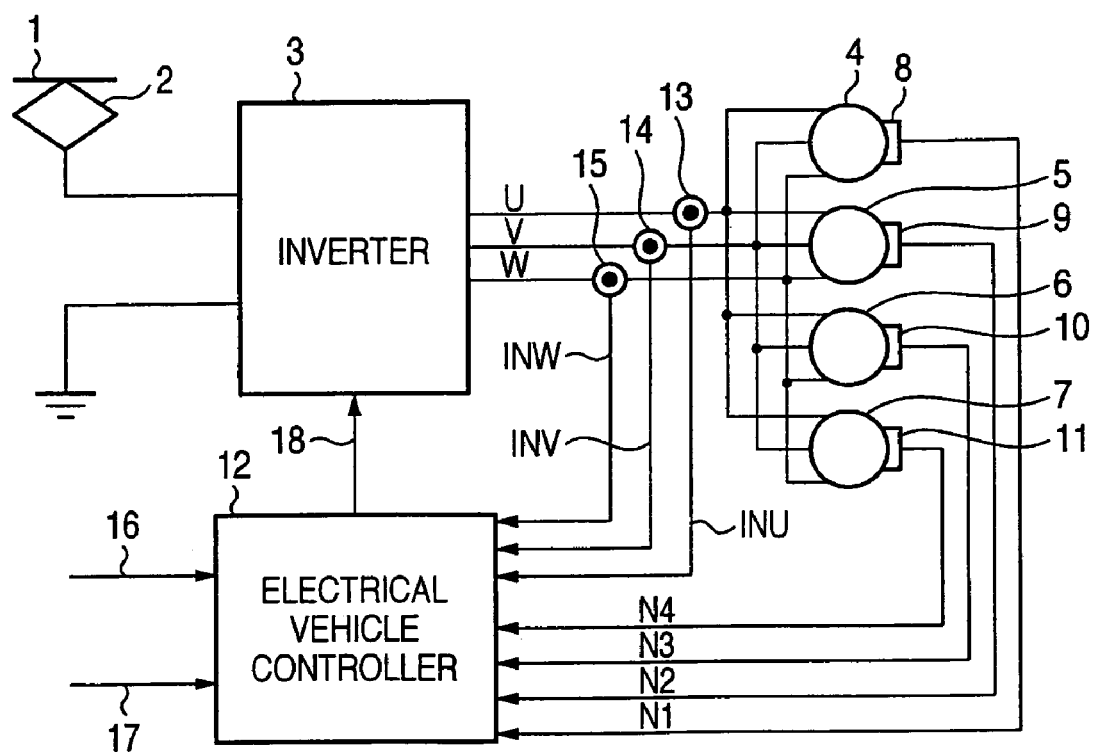
FIG. 1 is a diagram showing the relationship of an electrical vehicle controller, an inverter and AC electric motors according to a first embodiment of the invention.
Figure 2:
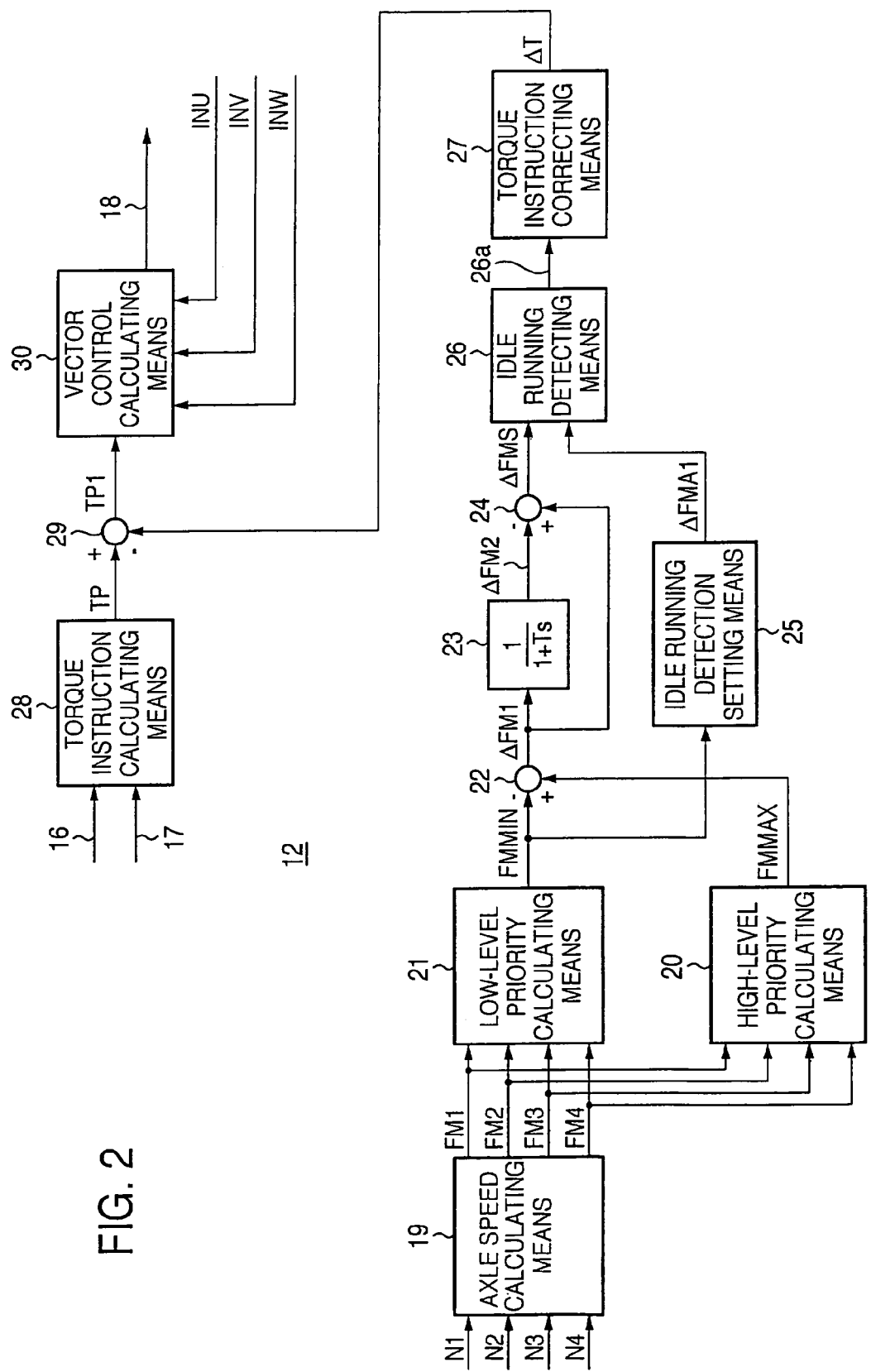
FIG. 2 is a block diagram showing the electrical vehicle controller according to the first embodiment of the invention.
Figure 3:
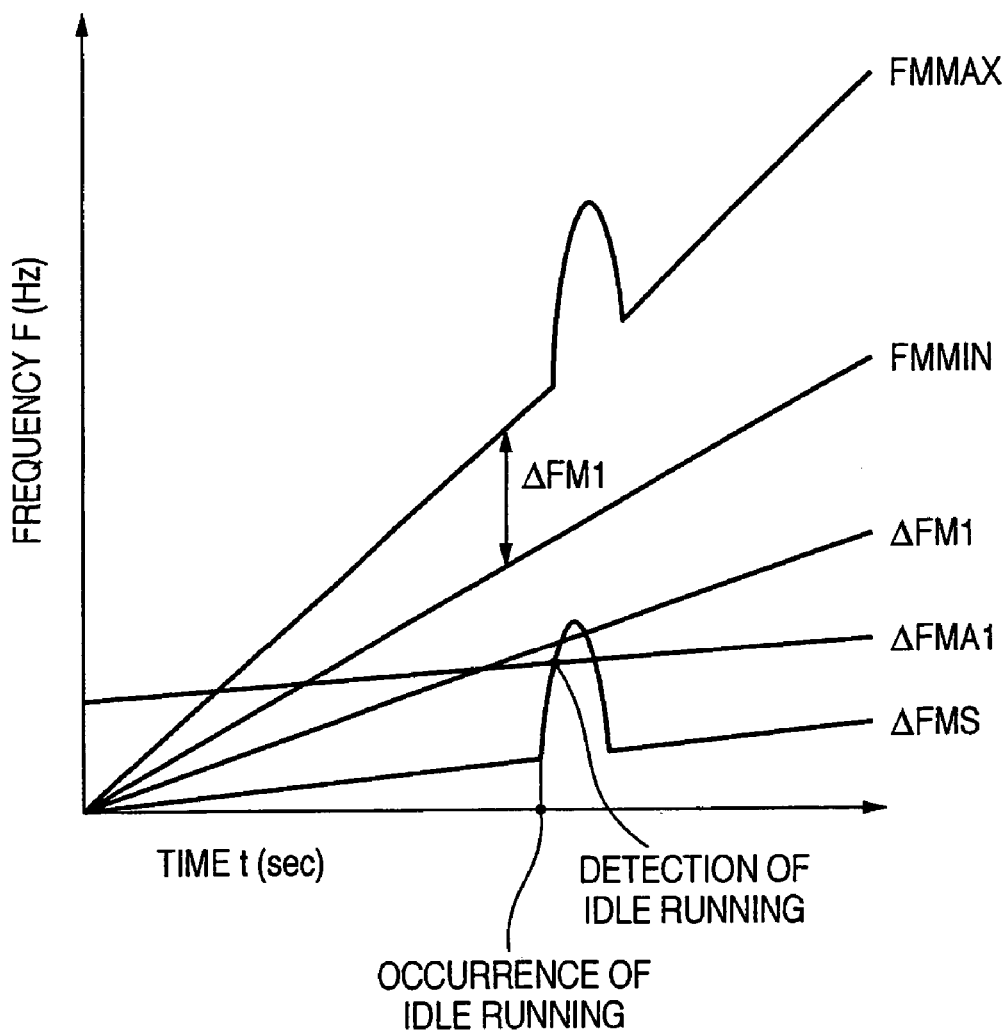
FIG. 3 is a diagram showing idle running detection in FIG. 2.
Figure 4:
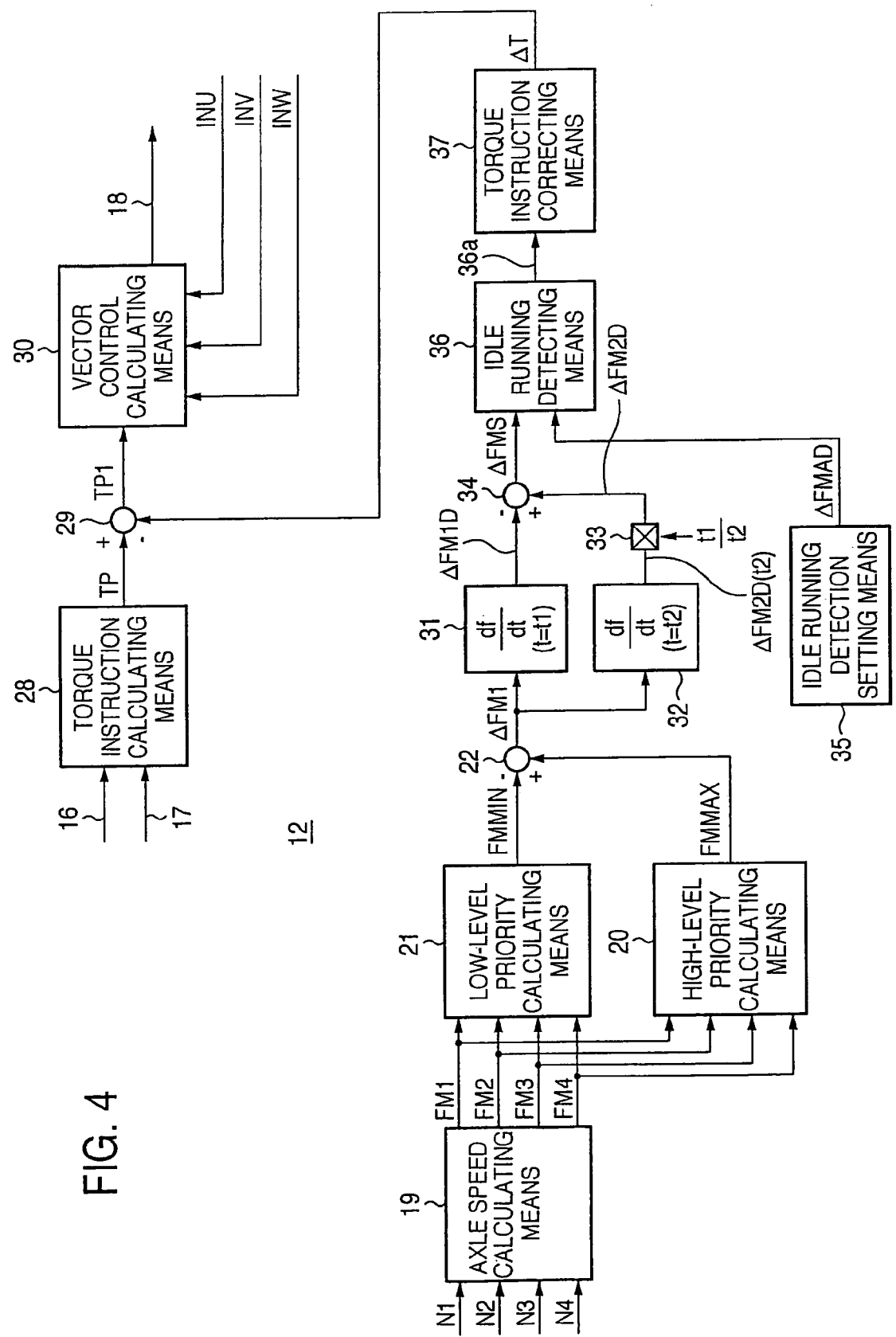
FIG. 4 is a block diagram showing an electrical vehicle controller according to a second embodiment of the invention.
Figure 5:
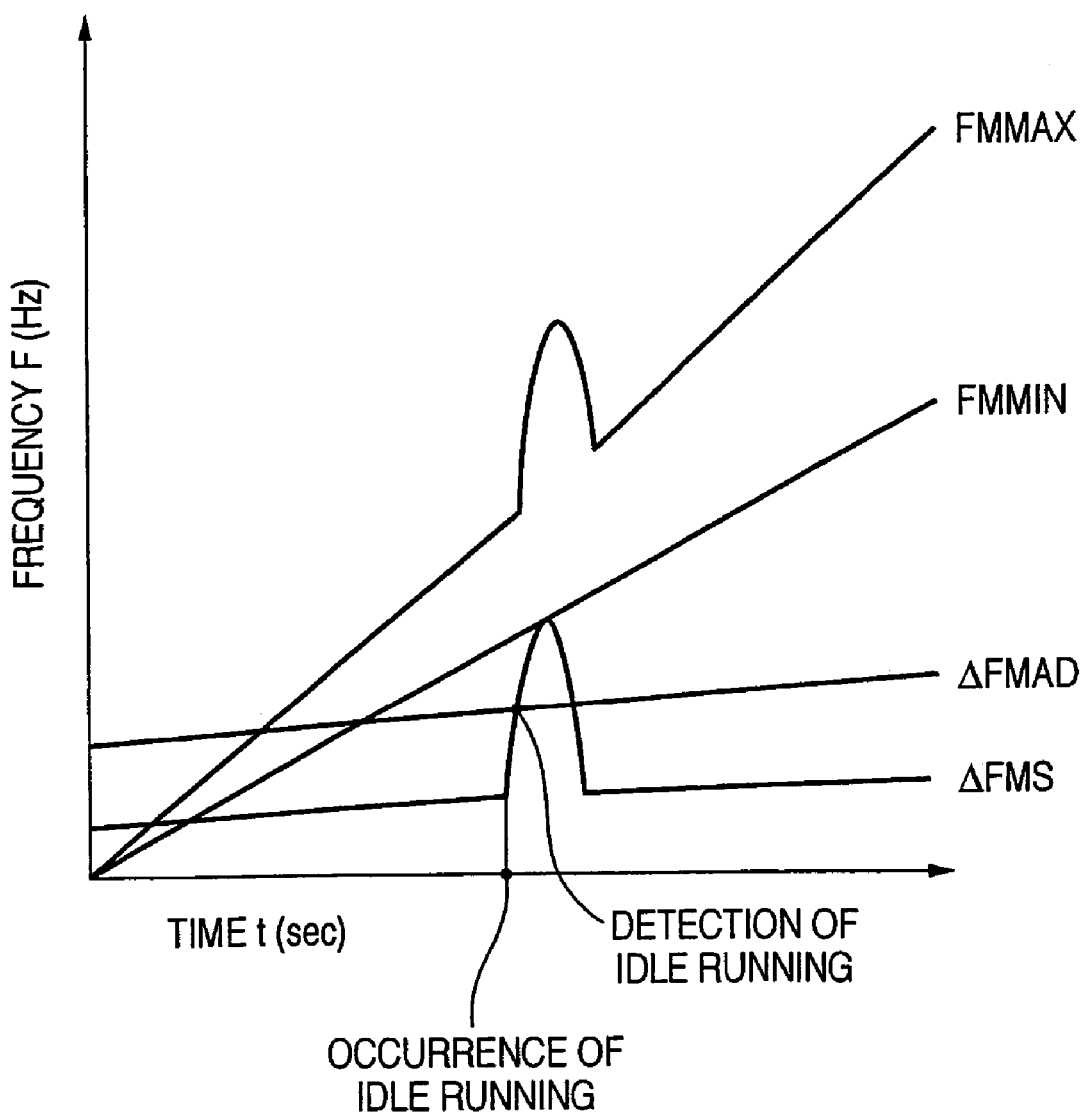
FIG. 5 is a diagram showing idle running detection.
Figure 6:
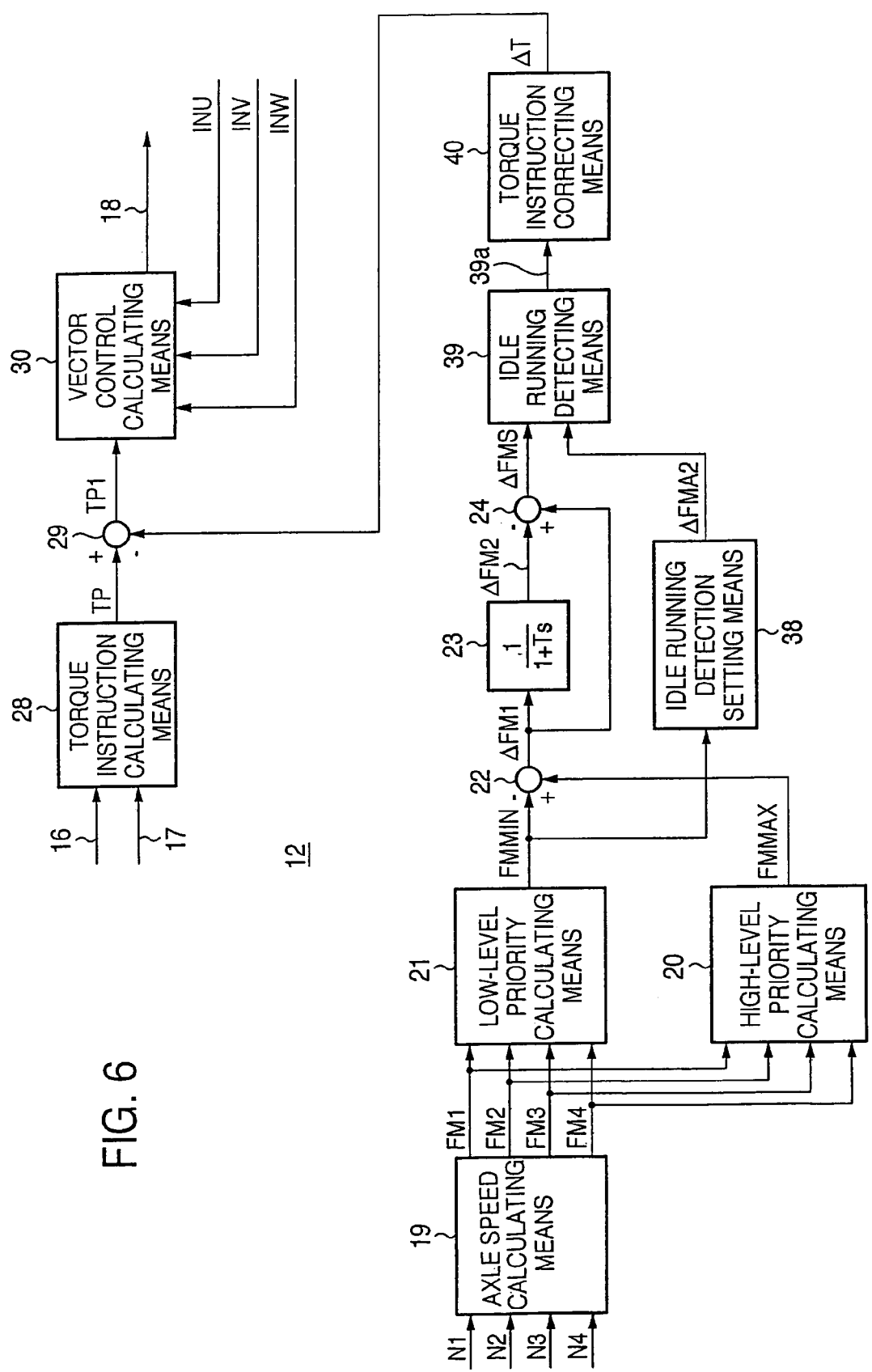
FIG. 6 is a block diagram showing an electrical vehicle controller according to a third embodiment of the invention.
Figure 7:
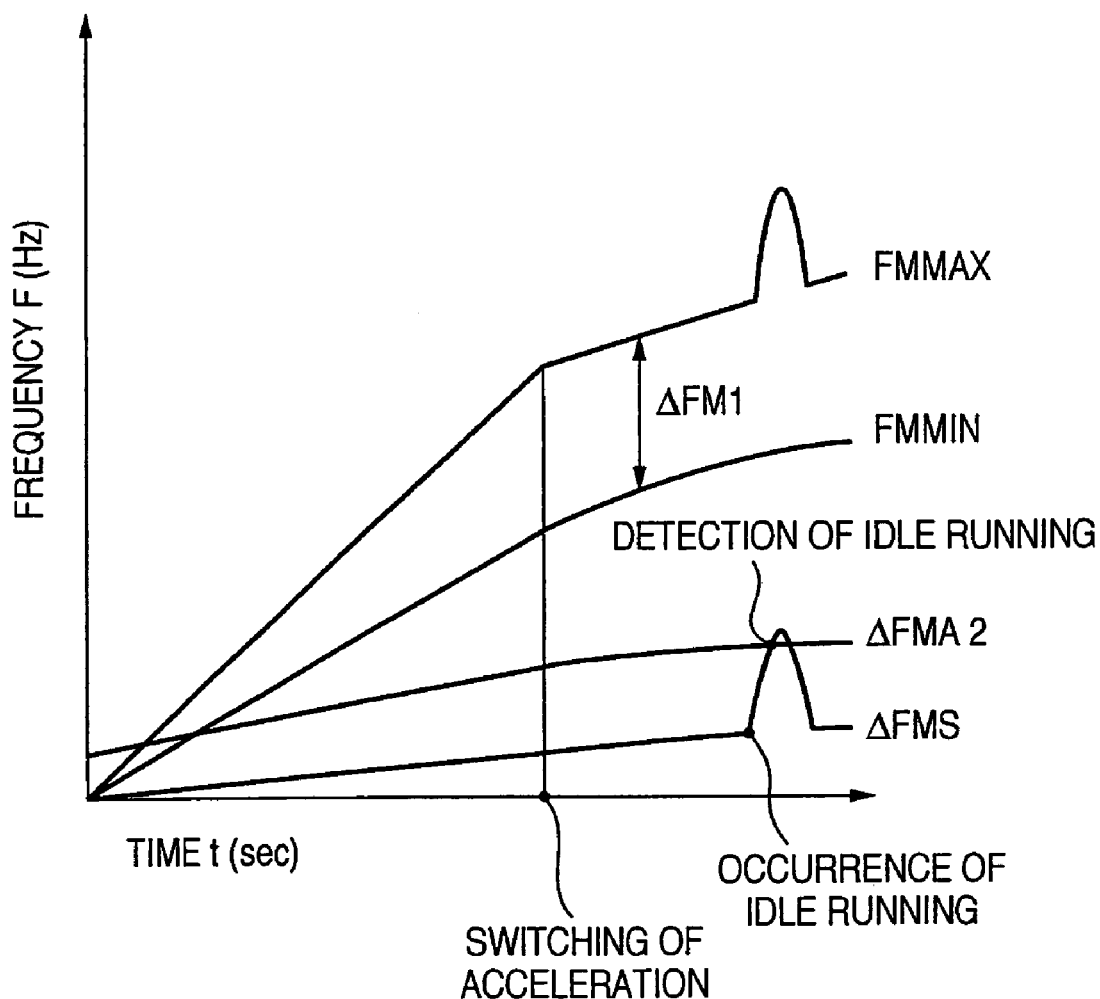
FIG. 7 is a diagram showing switching of a torque pattern in FIG. 6.
Figure 8:
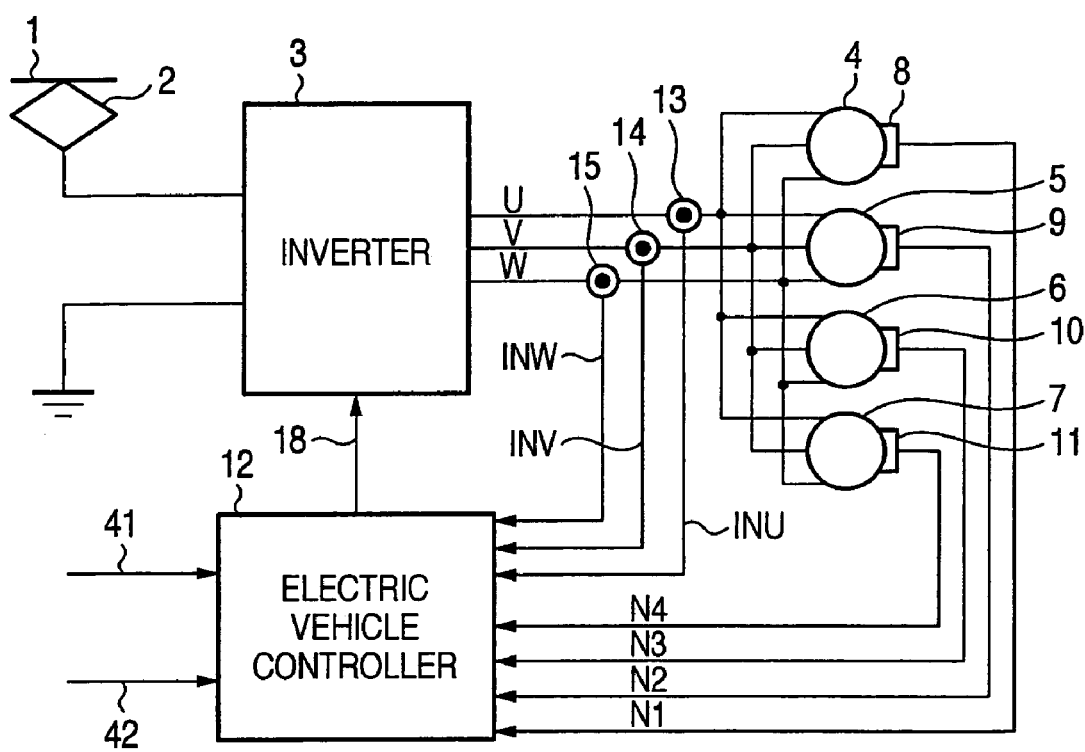
FIG. 8 is a diagram showing the relationship of an electrical vehicle controller, an inverter and AC electric motors according to a fourth embodiment of the invention.
Figure 9:
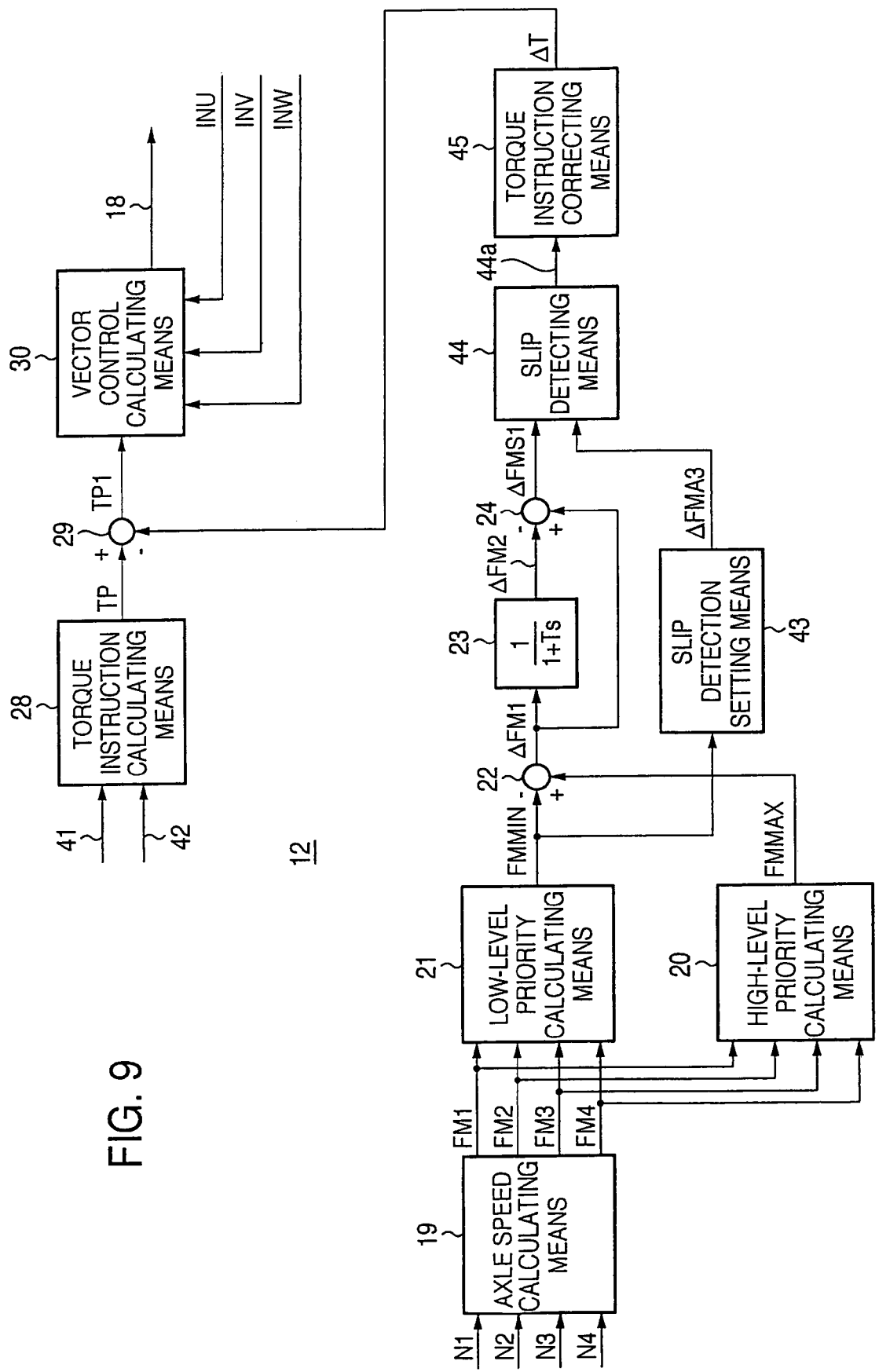
FIG. 9 is a block diagram showing the electrical vehicle controller of the fourth embodiment of the invention.
Figure 10:
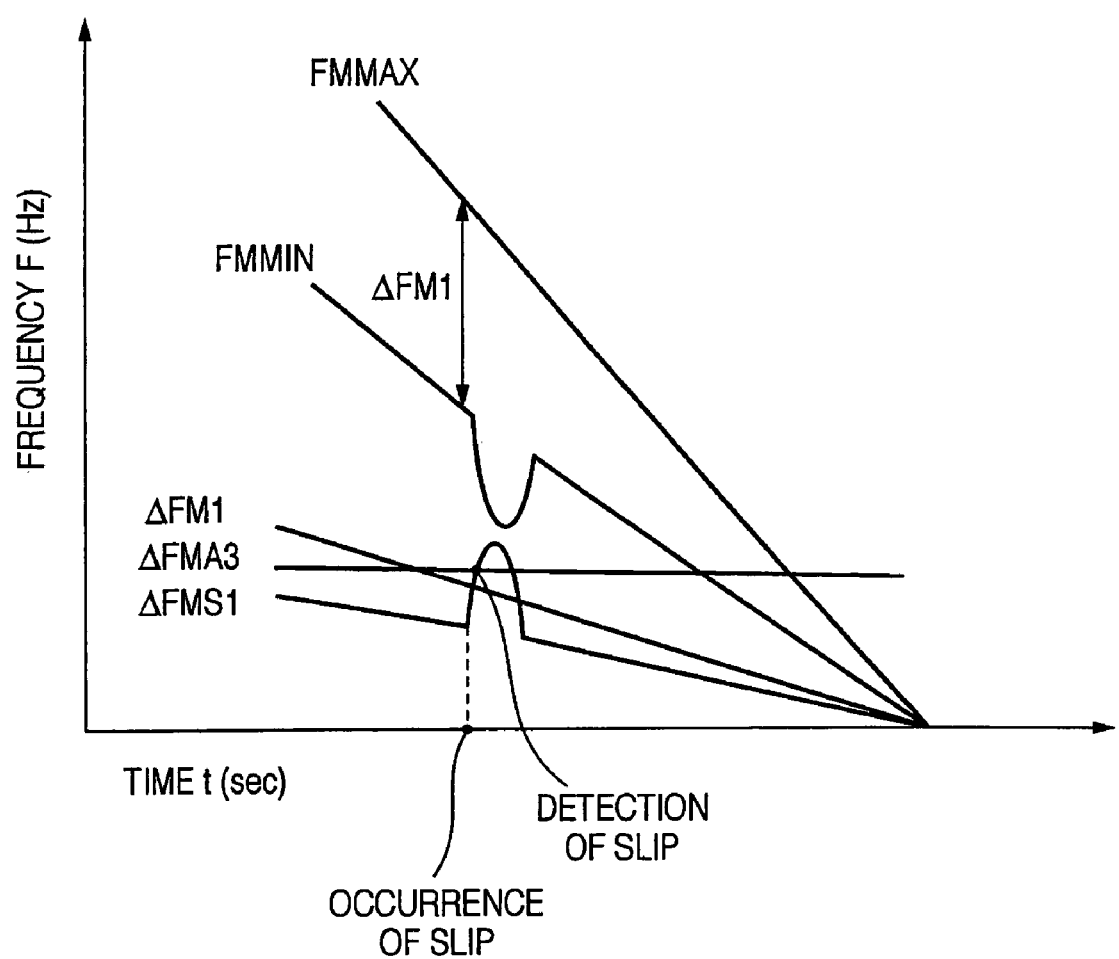
FIG. 10 is a diagram showing idle running detection in FIG. 9.
Figure 11:
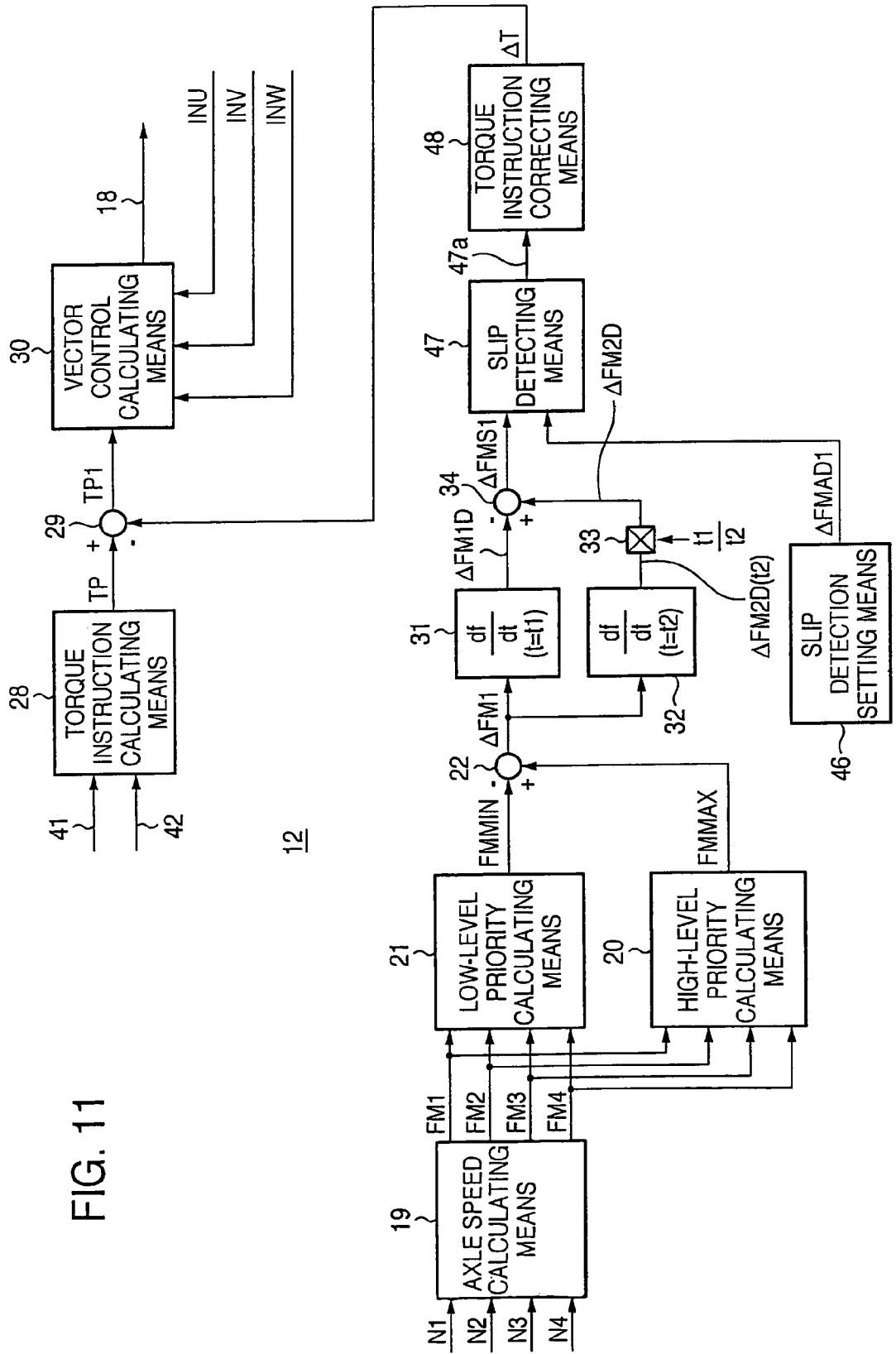
FIG. 11 is a block diagram showing an electrical vehicle controller according to a fifth embodiment of the invention.
Figure 12:
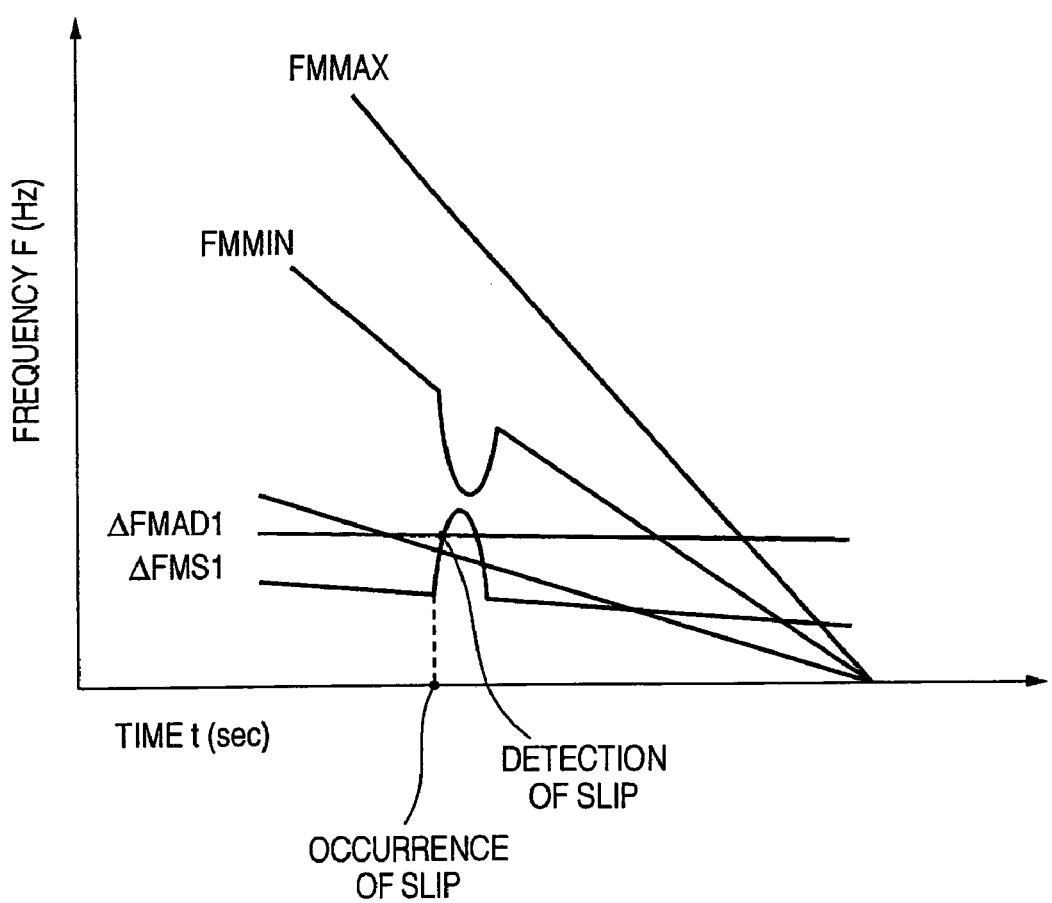
FIG. 12 is a diagram showing idle running detection in FIG. 11.
Figure 13:
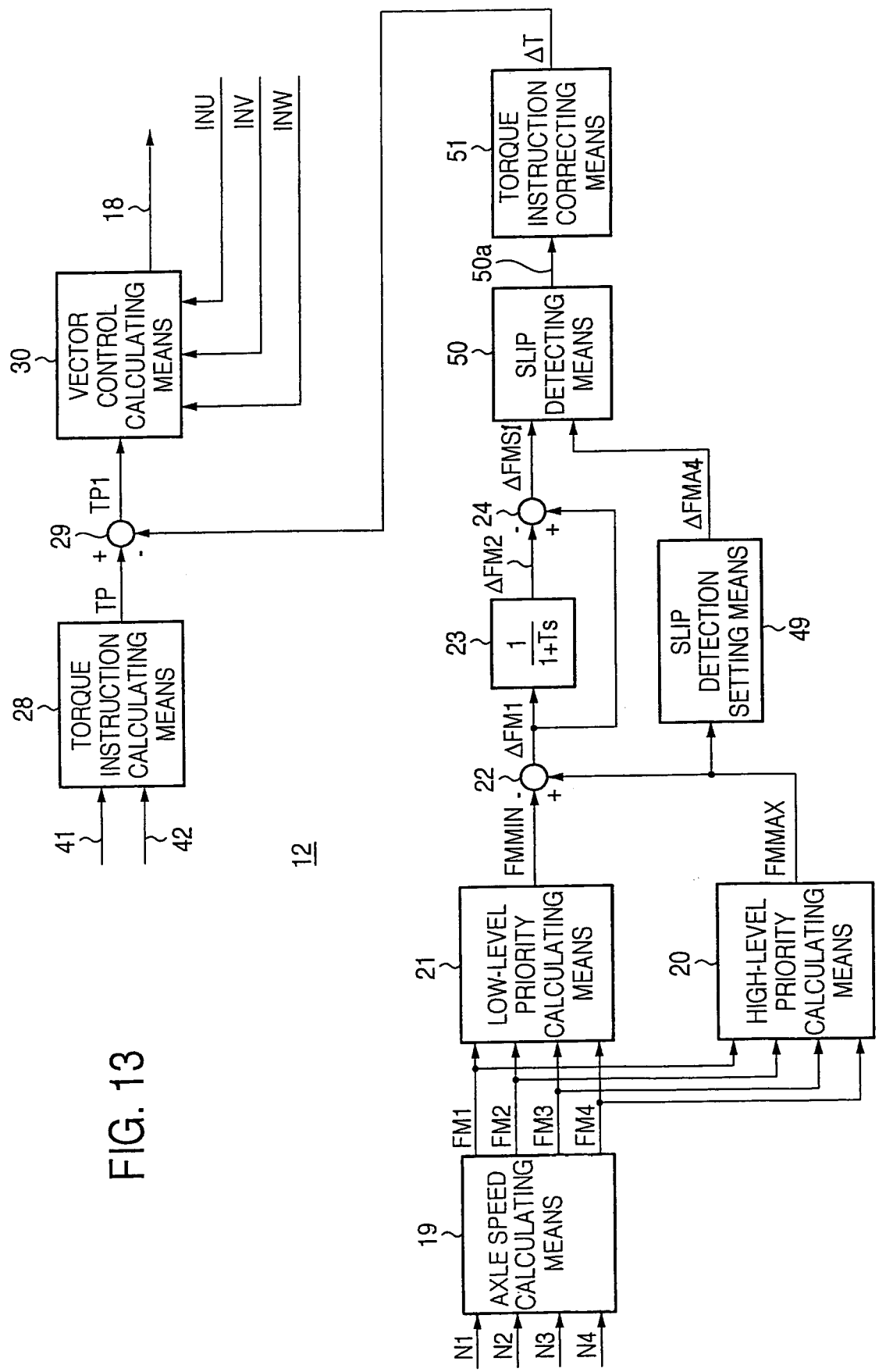
FIG. 13 is a block diagram showing an electrical vehicle controller according to a sixth embodiment of the invention.
Figure 14:
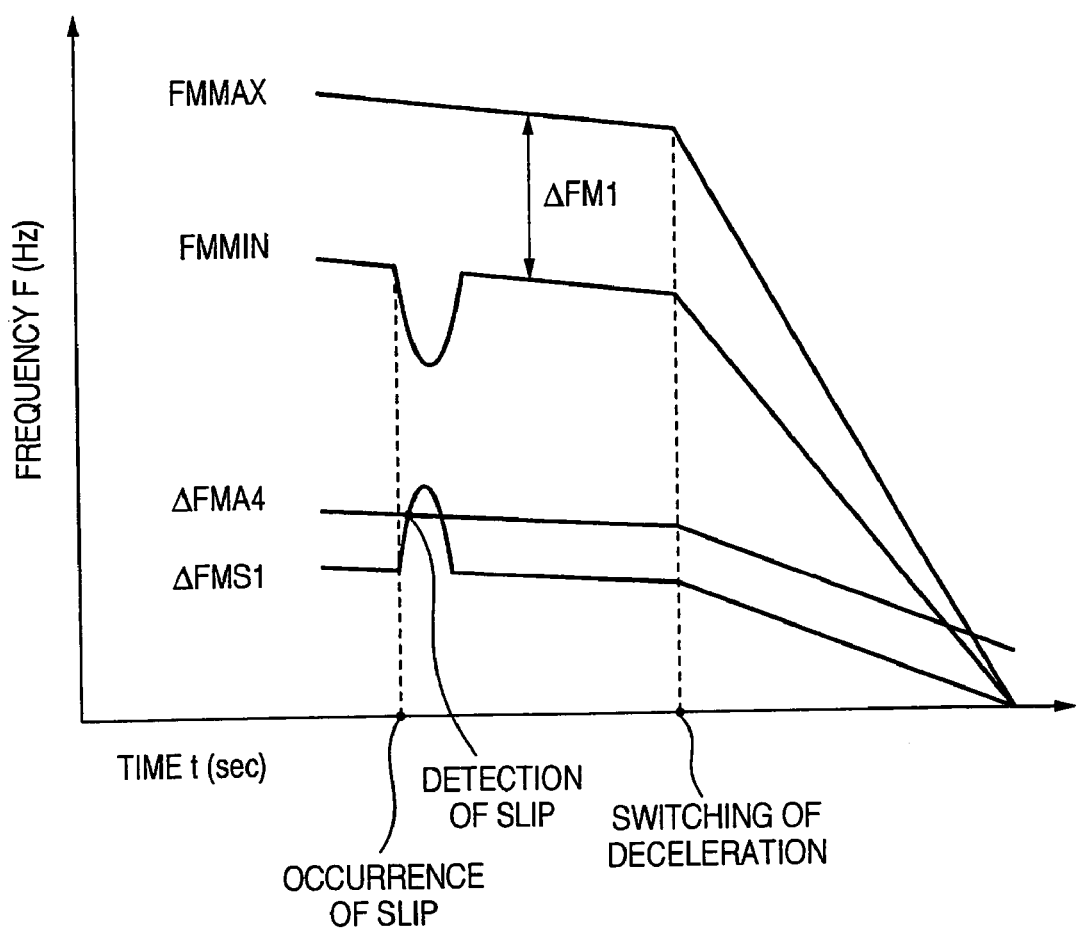
FIG. 14 is a diagram showing switching of a torque pattern in FIG. 13.

DESCRIPTION OF REFERENCE NUMERALS 3 inverter, 4 to 7 AC electric motors, 12 electrical vehicle controller, 20 high-level priority calculating means, 21 low-level priority calculating means, 22 first subtracter, 23 primary delay means, 24 second subtracter, 25, 35, 38 idle running detection setting means, 26, 36, 39 idle running detecting means, 27, 29, 37, 40, 45, 48, 51 torque instruction correcting means, 28 torque instruction calculating means, 30 vector control calculating means, 31 first time-differentiating means, 32 second time-differentiating means, 33 converting means, 34 second subtracter, 41 brake instruction signal, 42 brake force instruction signal, 43, 46, 49 slip detection setting means, 44, 47, 50 slip detecting means

The invention claimed is:

1. An electrical vehicle controller for detecting axle speeds of axles corresponding to plural AC electric motors torque-controlled by an inverter and detecting idle running of wheels directly joined to the axles, comprising: high-level priority calculating means for extracting the maximum frequency from frequencies corresponding to the respective axle speeds; low-level priority calculating means for extracting the minimum frequency from the frequencies corresponding to the respective axle speeds; a first subtracter for subtracting the minimum frequency from the maximum frequency to calculate a first frequency deviation; primary delay means to which the first frequency deviation is input as a primary delay system to calculate a second frequency deviation; a second subtracter for subtracting the second frequency deviation from the first frequency deviation to calculate an idle running frequency deviation; idle running detection setting means for outputting an idle running detection set value for judging the idle running of the wheels at the frequency level; idle running detecting means for comparing the idle running frequency deviation and the idle running detection set value with each other and outputting an idle running detection signal when the idle running frequency deviation is larger than the idle running detection set value; and torque instruction correcting means for calculating a torque correction amount of the AC electric motors on the basis of the idle running detection signal and instructing torque correction to the inverter.

2. An electrical vehicle controller for detecting axle speeds of axles corresponding to plural AC electric motors torque-controlled by an inverter and detecting idle running of wheels directly joined to the axles, in which plural induction motors corresponding to a predetermined number of drying wheel shafts are driven in parallel by one inverter, comprising: high-level priority calculating means for extracting the maximum frequency from frequencies corresponding to the respective axle speeds; low-level priority calculating means for extracting the minimum frequency from the frequencies corresponding to the respective axle speeds; a first subtracter for subtracting the minimum frequency from the maximum frequency to calculate a first frequency deviation; first time-differentiating means for time-differentiating the first frequency deviation from a predetermined time measurement start time for a predetermined time t1 to calculate a first time variation amount; second time-differentiating means for time-differentiating the first frequency deviation from the time measurement start time for a predetermined time t2 longer than the time t1 to calculate a temporary time variation amount; converting means for converting the temporary time variation amount to the variation amount of the time t1 to calculate a second time variation amount; a second subtracter for subtracting the first time variation amount from the second time variation amount to calculate an idle running frequency deviation; idle running detection setting means for outputting an idle running detection set value for judging the idle running of the wheels at the frequency level; idle running detection signal generating means for comparing the idle running frequency deviation with the idle running detection set value and outputting an idle running detection signal when the idle running frequency deviation is larger than the idle running detection set value; and torque instruction correcting means for calculating the torque correction amount of the AC electric motors on the basis of the idle running detection signal and instructing torque correction to the inverter.

3. An electrical vehicle controller for detecting axle speeds of axles corresponding to plural AC electric motors torque-controlled by an inverter and detecting idle running of wheels directly joined to the axles, comprising: high-level priority calculating means for extracting the maximum frequency from frequencies corresponding to the respective axle speeds; low-level priority calculating means for extracting the minimum frequency from the frequencies corresponding to the respective axle speeds; a first subtracter for subtracting the minimum frequency from the maximum frequency to calculate a first frequency deviation; primary delay means to which the first frequency deviation is input as a primary delay system to subtract a second frequency deviation; a second subtracter for subtracting the second frequency deviation from the first frequency deviation to calculate an idle running frequency deviation; idle running detection setting means for carrying out idle running detection setting for judging the idle running of the axles at the frequency level and comparing the idle running detection set value with a predetermined value when the frequency corresponding to the axle speed reaches a predetermined value, and outputting the idle running detection set value with the idle running frequency deviation reducing the idle running detection set value by only a predetermined value; idle running detecting means for comparing the idle running frequency deviation and the idle running detection set value with each other and outputting an idle running detection signal when the idle running frequency deviation is larger than the idle running detection set value; and torque instruction correcting means for calculating a torque correction amount of the AC electric motors on the basis of the idle running detection signal and instructing torque correction to the inverter.

4. The electrical vehicle controller according to claim 3, wherein the idle running detection set value is switched in conformity with the motor characteristic when the frequency corresponding to the axle speed shifts from the constant acceleration area of the induction motor and reaches the motor characteristic area.

5. The electrical vehicle controller according to claim 1, wherein by detecting slip occurring in the wheels directly-connected to the axles corresponding to the plural AC electric motors during braking operation of the vehicle, torque control is carried out.

6. The electrical vehicle controller according to claim 2, wherein by detecting slip occurring in the wheels directly-connected to the axles corresponding to the plural AC electric motors during braking operation of the vehicle, torque control is carried out.

7. The electrical vehicle controller according to claim 3, wherein by detecting slip occurring in the wheels directly-connected to the axles corresponding to the plural AC electric motors during braking operation of the vehicle, torque control is carried out.

* * * * *